Dec. 6, 1955   P. L. TAILER   2,725,715
GEAR OR WHEEL SUSPENSION SYSTEM FOR CLOCKWORK MECHANISM
Filed Aug. 10, 1953
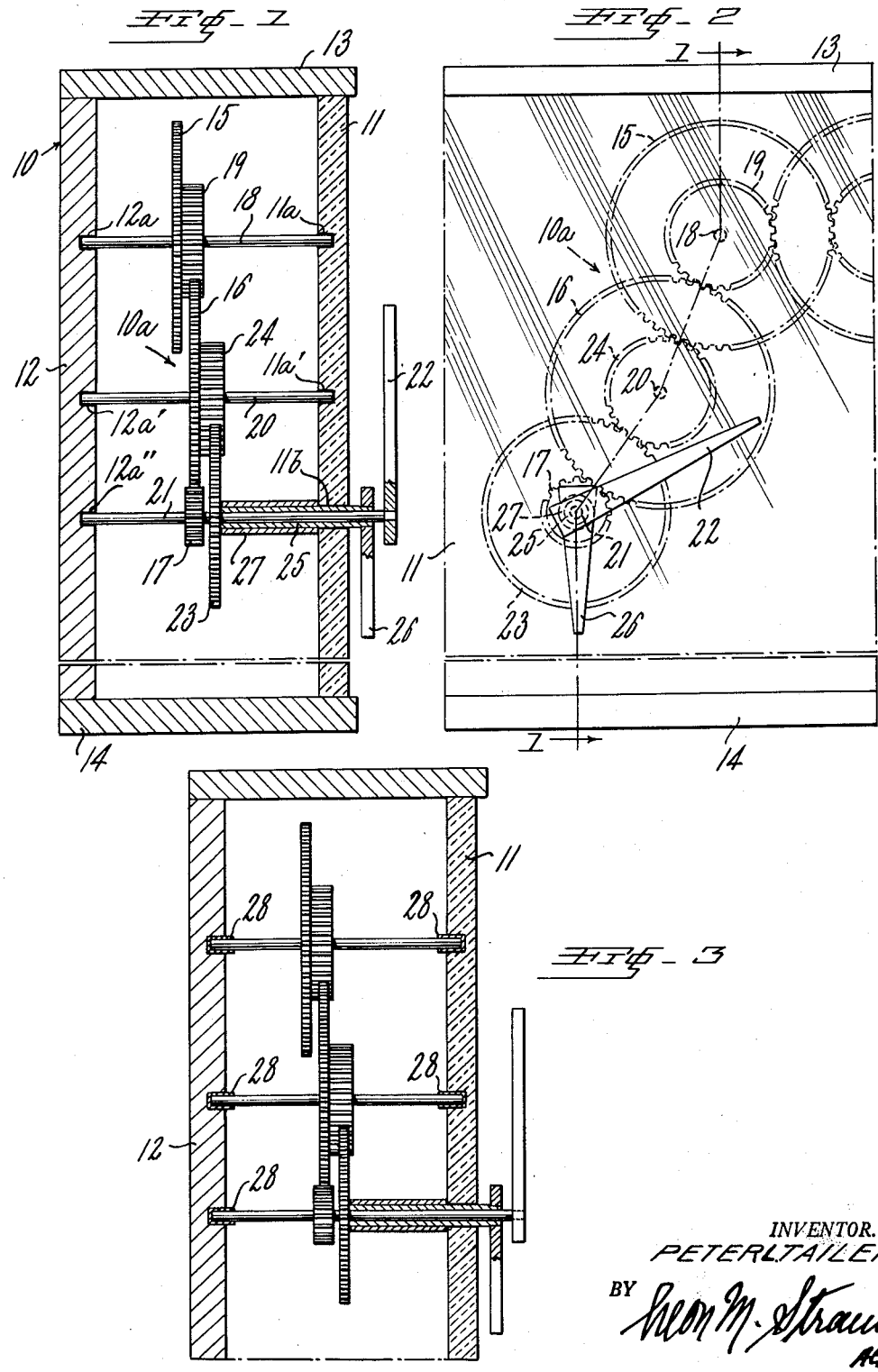
INVENTOR.
PETER L. TAILER
BY

United States Patent Office 2,725,715
Patented Dec. 6, 1955

2,725,715

GEAR OR WHEEL SUSPENSION SYSTEM FOR CLOCKWORK MECHANISM

Peter L. Tailer, New York, N. Y.

Application August 10, 1953, Serial No. 373,221

2 Claims. (Cl. 58—55)

The present invention relates generally to suspensions and, more particularly, to gear or wheel suspension systems for clockwork mechanisms.

A primary object of the invention is the provision of novel means serving combinedly as a frame or casing for a clockwork mechanism, as well as bearing means for supporting the shafts or spindles of gears or wheels for driving the clockwork mechanism.

Another object of the invention is to provide means for effectively supporting rotatable intermeshing components of the clockwork mechanism, whereby the necessity of employing and assembling a large number of jewel bearings and like structures of high precision is avoided.

A further object of the invention is the provision of means facilitating simple, inexpensive and rapid assembly of the component gear and like elements of a clockwork mechanism, and of further means conducive to maintain these assembled components in precision alignment even during extended use.

An additional object of the invention is the provision of means of the character indicated enabling the use of materials, such as glass, synthetic resins and similar material as enclosure elements which are constructed and arranged for simultaneously serving as bearing means for the rotatable components of a clockwork mechanism without requiring the use of internal spacer plates and supporting elements.

The foregoinng objects, as well as additional objects and advantages of the invention will be readily apparent from the following detailed description taken in connection with the accompanying drawing which illustrates preferred embodiments of the invention, and wherein:

Fig. 1 is a sectional view, taken on line 1—1 of Fig. 2, showing a housing with a clockwork mechanism suspended therein in accordance with features of the invention;

Fig. 2 is a front elevation of Fig. 1;

Fig. 3 is a sectional view of a housing with mechanism illustrating a modified form of the invention.

Referring now to the drawing in greater detail, and particularly to Figs. 1 and 2, there is shown a clockwork mechanism 10a. It will be understood that the invention is adaptable to a large variety of gear and wheel suspensions as used, for instance, in the instrument and kindred industries.

The enclosure or housing 10 is made of glass or synthetic resin or like suitable composition material capable of being fabricated in desired dimensions by machining, cutting or molding. Said housing or casing preferably includes a transparent front wall 11 forming a cover and a rear wall 12 maintained in spaced apart relation by top wall 13 and bottom wall 14 secured in place by means of adhesive or in any other suitable manner.

Front wall 11 and rear wall 12 are provided with a plurality of cooperating pairs of oppositely disposed, aligned bearing recesses 11a and 12a, respectively, cut or drilled for the reception of opposite ends of the shafts or spindles of the rotatable intermeshing components of a clockwork mechanism, as will be more fully described hereinafter. In the embodiment of Figs. 1 and 2, a clockwork 10a mechanism is illustrated as including a train of gears comprising gear wheels 15 and 16 and a pinion 17.

Gear wheel 15 is fixedly mounted on a shaft 18 having its opposite highly polished ends inserted within a pair of aligned bearing recesses 11a, 12a of front wall 11 and rear wall 12, respectively. A pinion 19 may be fixedly mounted on shaft 18 and in meshing engagement with gear wheel 16, the latter being in turn fixedly mounted on a shaft 20 having its opposite highly polished ends retained within a pair of aligned bearing recesses 11a', 12a'. Gear wheel 16 meshes with pinion 17 fixedly supported on a shaft 21 which has one of its highly polished ends retained in a bearing recess 12a'' of rear wall 12. The opposite end of pinion shaft 21 projects through an aperture 11b formed in front wall 11 and extends beyond said front wall a suitable distance to permit attachment of an indicated element which may take the form of a minute hand 22.

Pinion shaft 21 also supports thereupon a gear 23 which meshes with a pinion 24 fixedly retained on shaft 20 adjacent gear wheel 16. A sleeve 25 fixed to gear 23 and surrounding pinion shaft 21 extends through aperture 11b of front wall 11 and extends anteriorly thereof a suitable distance to permit attachment of an indicator element which may take the form of an hour hand 26. A spacer member 27 may be interposed between the inner face of front wall 11 and gear 23 for maintaining said gear against lateral displacement and out of meshing engagement with fixed pinion 24 on shaft 20.

It will be understood that the aligned bearing recesses 11a, 12a may be formed depending upon the material employed, by means of precision drilling, by precision molding or in any other manner conducive to the production of the high precision and dimensional accuracy required for bearing surfaces.

Fig. 3 illustrates an embodiment of the invention similar to the embodiment of Figs. 1 and 2, but with the aligned bearing recesses 11a, 12a of front wall 11 and rear wall 12, respectively, provided with bearing inserts or sockets 28 made of brass, bronze or other suitable wear-resistant material. By providing the bearing inserts or sockets 28, a greater latitude of choice is possible in selecting the casing material of which the front wall 11 and the rear wall 12 are made, since only the bearing inserts 28 must have desired hardness, smoothness and wear-resistance requisite for this type of bearing surfaces.

It will thus be apparent that the present invention provides means serving combinedly as enclosure means or casing means for a clockwork or instrument mechanism, as well as bearing means for supporting the shafts or spindles of gears or wheels for actuating said mechanism. Moreover, the arrangement of the invention facilitates simple, inexpensive and rapid assembly of the component elements of clockwork or instrument mechanisms and eliminates the necessity of using a plurality of jewel bearings, internal spacer plates and other supporting elements.

Since certain modifications may be made in the device of the present invention without departing from the scope thereof, it is intended that all matter contained in the foregoing description and shown in the accompanying drawing be interpreted merely as illustrative and not in a limiting sense.

Having thus described the invention, what is claimed as new and desired to be secured by Letters Patent, is:

1. The combination of a housing having opposite walls, both of said walls being of transparent material, one of said walls being made of glass, with means for driving a mechanism, said means including at least one gear, and a shaft for supporting said gear and terminating in opposite ends, said opposite walls being provided with aligned recesses extending from one face of each of said walls short of the other face thereof for receiving the ends of said shaft and forming bearing means therefor, said walls forming a cover for said housing for perceiving therethrough said mechanism.

2. In combination, a housing having opposite walls, both of said walls being transparent, one of said walls being made of glass material, means for driving a mechanism contained in said housing and including at least one gear, and a shaft supporting said gear, said shaft terminating in two opposite, highly polished, cylindrical ends, said opposite walls being provided with aligned recesses defined by respective diameters for slidably receiving therein said shaft ends, respectively, said one wall forming a cover for said housing for perceiving therethrough said shaft.

References Cited in the file of this patent

UNITED STATES PATENTS

| | | |
|---|---|---|
| 360,475 | Potter | Apr. 5, 1887 |
| 360,476 | Potter | Apr. 5, 1887 |
| 360,819 | Potter | Apr. 5, 1887 |
| 2,013,208 | Hammond | Sept. 3, 1935 |
| 2,260,835 | Haapanen | Oct. 28, 1941 |
| 2,595,157 | Mayer | Apr. 29, 1952 |

FOREIGN PATENTS

| | | |
|---|---|---|
| 504,693 | Great Britain | Apr. 28, 1939 |
| 239,571 | Switzerland | Feb. 1, 1946 |